(12) United States Patent
Lee et al.

(10) Patent No.: US 8,675,603 B2
(45) Date of Patent: Mar. 18, 2014

(54) METHOD OF GENERATING SIGNAL FOR SUPPORTING VEHICLE COMMUNICATION HANDOVER

(75) Inventors: Sangwoo Lee, Daejeon (KR); Min Jung Kim, Daejeon (KR); Woong Cho, Daejeon (KR); Hyun Seo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 552 days.

(21) Appl. No.: 12/984,830

(22) Filed: Jan. 5, 2011

(65) Prior Publication Data

US 2011/0292910 A1 Dec. 1, 2011

(30) Foreign Application Priority Data

May 25, 2010 (KR) .................. 10-2010-0048835

(51) Int. Cl.
*H04W 4/00* (2009.01)

(52) U.S. Cl.
USPC .............................................. 370/331

(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–529
See application file for complete search history.

(56) References Cited

U.S. PATENT DOCUMENTS

| | | | |
|---|---|---|---|
| 2008/0232309 A1* | 9/2008 | McNew et al. | 370/329 |
| 2008/0232433 A1* | 9/2008 | McNew et al. | 375/140 |
| 2011/0128849 A1* | 6/2011 | Guo | 370/235 |
| 2011/0141970 A1* | 6/2011 | Juan et al. | 370/328 |
| 2011/0255482 A1* | 10/2011 | Holland et al. | 370/329 |
| 2011/0294424 A1* | 12/2011 | Hu et al. | 455/41.2 |
| 2011/0294434 A1* | 12/2011 | Hu et al. | 455/62 |
| 2011/0294447 A1* | 12/2011 | Hu et al. | 455/154.1 |
| 2011/0306353 A1* | 12/2011 | Kim et al. | 455/452.2 |
| 2013/0127643 A1* | 5/2013 | Malarky | 340/989 |

OTHER PUBLICATIONS

IEEE P1609.4™/D6.0, "Draft Standard for Wireless Access in Vehicular Environments (WAVE)—Multi-channel Operation", Mar. 2010; 1-67 pp.

* cited by examiner

*Primary Examiner* — Jung-Jen Liu
(74) *Attorney, Agent, or Firm* — Staas & Halsey LLP

(57) ABSTRACT

When supporting the handover from first road side equipment of a plurality of sets of road side equipment and second road side equipment that is adjacent to the first road side equipment to a vehicle, the first road side equipment generates a first channel seizing signal that is longer than that of the second road side equipment in a control channel of an N-th sync interval. The second road side equipment generates a second channel seizing signal that is longer than that of the first road side equipment in a control channel of an (N+1)-th sync interval.

7 Claims, 6 Drawing Sheets

METHOD OF GENERATING SIGNAL FOR SUPPORTING VEHICLE COMMUNICATION HANDOVER

CROSS-REFERENCE TO RELATED APPLICATION

This application claims priority to and the benefit of Korean Patent Application No. 10-2010-0048835 filed in the Korean Intellectual Property Office on May 25, 2010, the entire contents of which are incorporated herein by reference.

BACKGROUND OF THE INVENTION (a) Field of the Invention

The present invention relates to a method of generating a signal for supporting vehicle communication handover.

(b) Description of the Related Art

Wireless access in vehicular environments (WAVE) is technology that supplements a conventional wireless local area network (WLAN) (IEEE 802.11) method in order to support communication of a vehicle moving at a high speed. Intelligent transport systems using such WAVE communication include roadside equipment (hereinafter referred to as an "RSE") that is positioned at the roadside and on-board equipment (hereinafter referred to as an "OBE") that is mounted in a vehicle and perform vehicle-to-infrastructure (V2I) communications between the OBE and the RSE and vehicle-to-vehicle (V2V) communications between the OBEs.

In a road environment using such intelligent transport systems, the RSE that is installed at a road for continuous communication transmits information about a communication channel and a communication state to the OBE. In this case, when adjacent RSEs transmit information to the OBE through the same channel, the transmitted frames may collide, and such a frame is transmitted with a broadcast method and thus a transmission failure cannot be seen. Further, because the OBE and the RSEs can transmit a frame through the same channel, a possibility of a transmission failure increases, and a method of performing handover based on information of the RSE has a problem that it does not stably provide information.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of generating a signal for supporting vehicle communication handover having advantages of providing handover technology in a vehicle communication environment.

An exemplary embodiment of the present invention provides a method of generating a signal for supporting vehicle communication handover in a plurality of RSEs, the method including:

when supporting the handover from a first RSE of the plurality of RSEs and a second RSE that is adjacent to the first RSE to a vehicle, generating, by the first RSE, a first channel seizing signal that is longer than that of the second RSE in a control channel of an N-th sync interval; and generating, by the second RSE, a second channel seizing signal that is longer than that of the first RSE in a control channel of an (N+1)-th sync interval.

Another embodiment of the present invention provides a method of generating a signal for supporting vehicle communication handover in a plurality of RSEs, the method including:

when supporting the handover from a first RSE of the plurality of RSEs and a second RSE that is adjacent to the first RSE to a vehicle, generating, by the first RSE, a first channel seizing signal that is longer than that of the second RSE in a control channel of an N-th sync interval; sustaining, by the first RSE, the first channel seizing signal when the second RSE is in an interval that performs a backoff procedure with a maximum contention window (CW) value in the control channel of the N-th sync interval; generating, by the second RSE, a second channel seizing signal that is longer than that of the first RSE in a control channel of an (N+1)-th sync interval; and sustaining, by the second RSE, the second channel seizing signal when the first RSE is in an interval that performs a backoff procedure with a maximum CW value in the control channel of the (N+1)-th sync interval.

DETAILED DESCRIPTION OF THE EMBODIMENTS

Figure 1:
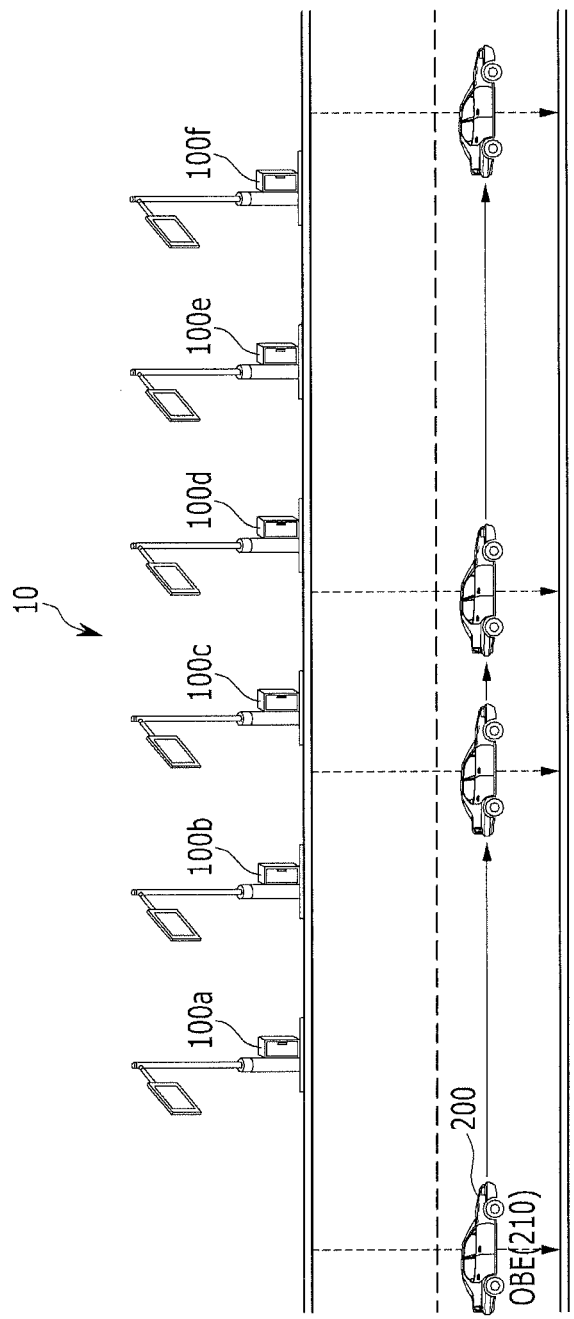
FIG. 1 is a diagram illustrating an example of a vehicle communication network for supporting vehicle communication handover according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Figure 2:
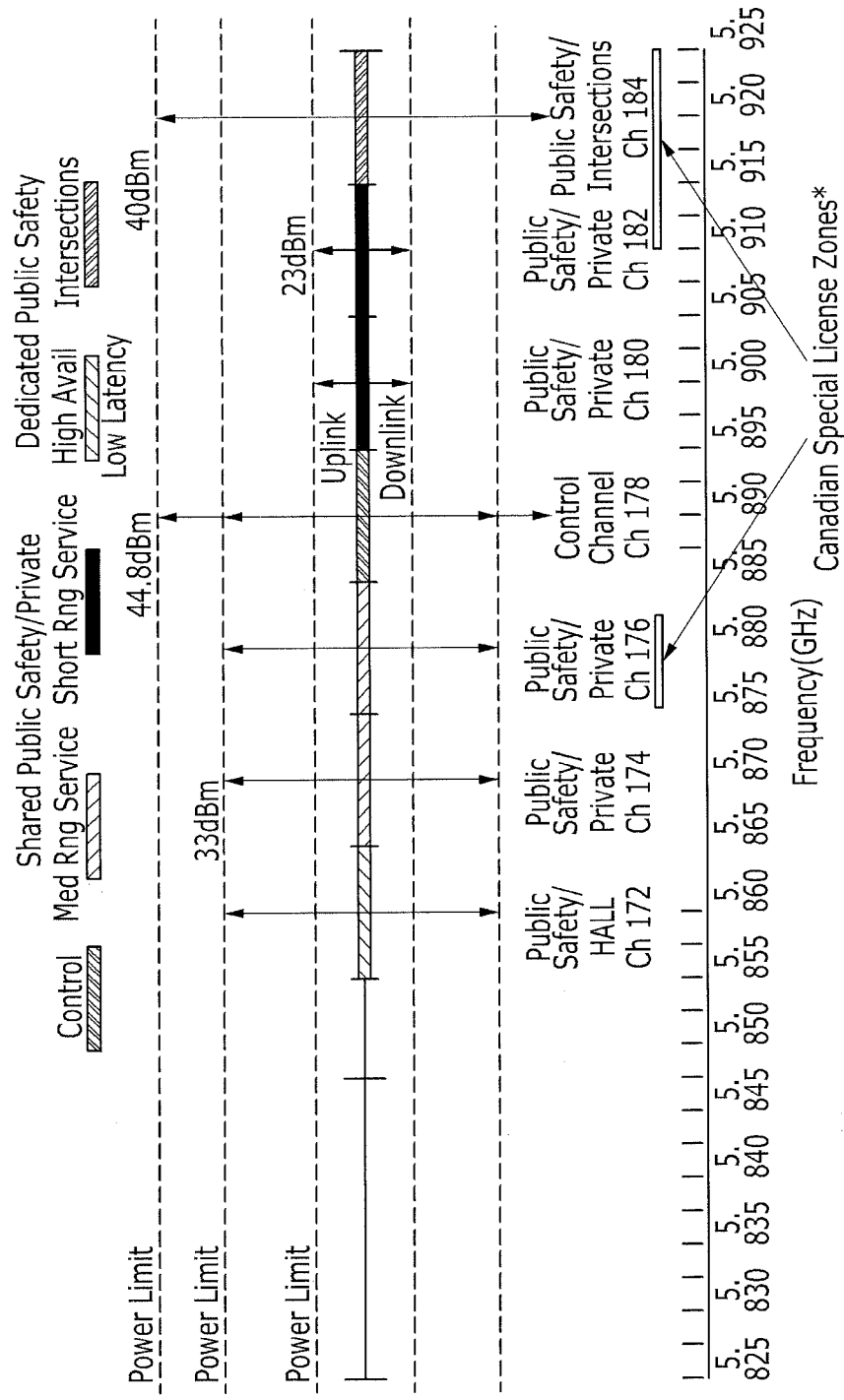
FIG. 2 is a diagram illustrating an example of a WAVE frequency for supporting vehicle communication in the vehicle communication network of FIG. 1.

FIG. 1 is a diagram illustrating an example of a vehicle communication network for supporting vehicle communication handover according to an exemplary embodiment of the present invention. FIG. 2 is a diagram illustrating an example of a WAVE frequency for supporting vehicle communication in the vehicle communication network of FIG. 1.

As shown in FIG. 1, in a vehicle communication environment for supporting vehicle communication handover according to an exemplary embodiment of the present invention, an intelligent transport system 10 includes roadside equipment (hereinafter referred to as an "RSE") 100a-100f and on-board equipment (hereinafter referred to as an "OBE") 210 that is mounted in a vehicle 200.

In such a vehicle communication environment, in order to support communication with a vehicle moving at a high speed, communication is performed in a WAVE method, and an example of frequencies in WAVE communication is shown in FIG. 2. Referring to FIG. 2, the WAVE is set to perform communication by allocating 75 MHz to 5.9 GHz band and using 7 channels of 10 MHz from the allocated 75 MHz. One of 7 channels is a control channel (hereinafter referred to as a "CCH"), and the remaining six channels are service channels (hereinafter referred to as an "SCH").

Figure 3:
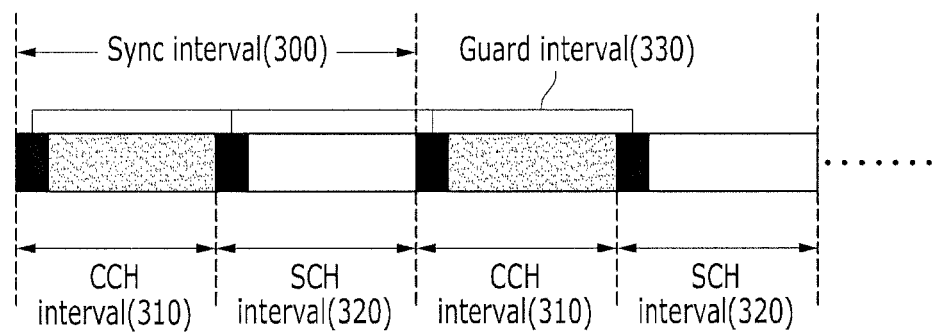
FIG. 3 is a diagram illustrating an example of a sync method for performing communication with an alternating mode in the vehicle communication network of FIG. 1.

When performing WAVE communication, communication may be simultaneously performed in all seven channels, and communication may be performed using one channel at a time. When performing communication using one channel at a time, communication may be performed based on several channels. That is, communication is performed in an alternating mode while alternating the CCH and the SCH, as shown in FIG. 3. In order to perform communication, a sync interval 300, a CCH interval 310, an SCH interval 320, and a guard interval 330 of the RSE and the OBE should be set.

Here, the guard interval 330 exists whenever alternating from the CCH interval 310 to the SCH interval 320 or from the SCH interval 320 to the CCH interval 310. That is, when the RSEs 100a-100f and the OBE 210 perform communication, the guard interval 330 is formed to compensate each time error. In order to perform continuous communication in an alternating mode in such a structure, it is essential to grasp information of the RSEs 100a-100f, particularly a communication channel and a communication state of the RSEs 100a-100f, and when information of the RSEs 100a-100f is effectively grasped, continuous communication can be performed.

In order to perform continuous communication between the RSEs 100a-100f and the OBE 210 operating in an alternating mode, necessary information of adjacent RSEs is transferred through the CCH interval 310. When the CCH interval 310 is started, each RSE transmits base station information. However, when adjacent RSEs transmits information thereof using the same CCH interval 310, the transmitted data frames may collide, and because the data frame is transmitted in a broadcast method, there is a problem that a transmission failure cannot be seen. In order to prevent this, each RSE determines that the CCH interval 310 is occupied during the guard interval 330 and should stop transmission. However, after the guard interval 330 is terminated, because transmission is tried via a backoff process, there is a problem that a collision possibility of data frames still exists.

Hereinafter, in order to solve such a problem, a method of generating a signal for supporting vehicle communication handover in a vehicle communication environment according to an exemplary embodiment of the present invention will be described in detail with reference to FIGS. 4 and 5.

Figure 4:
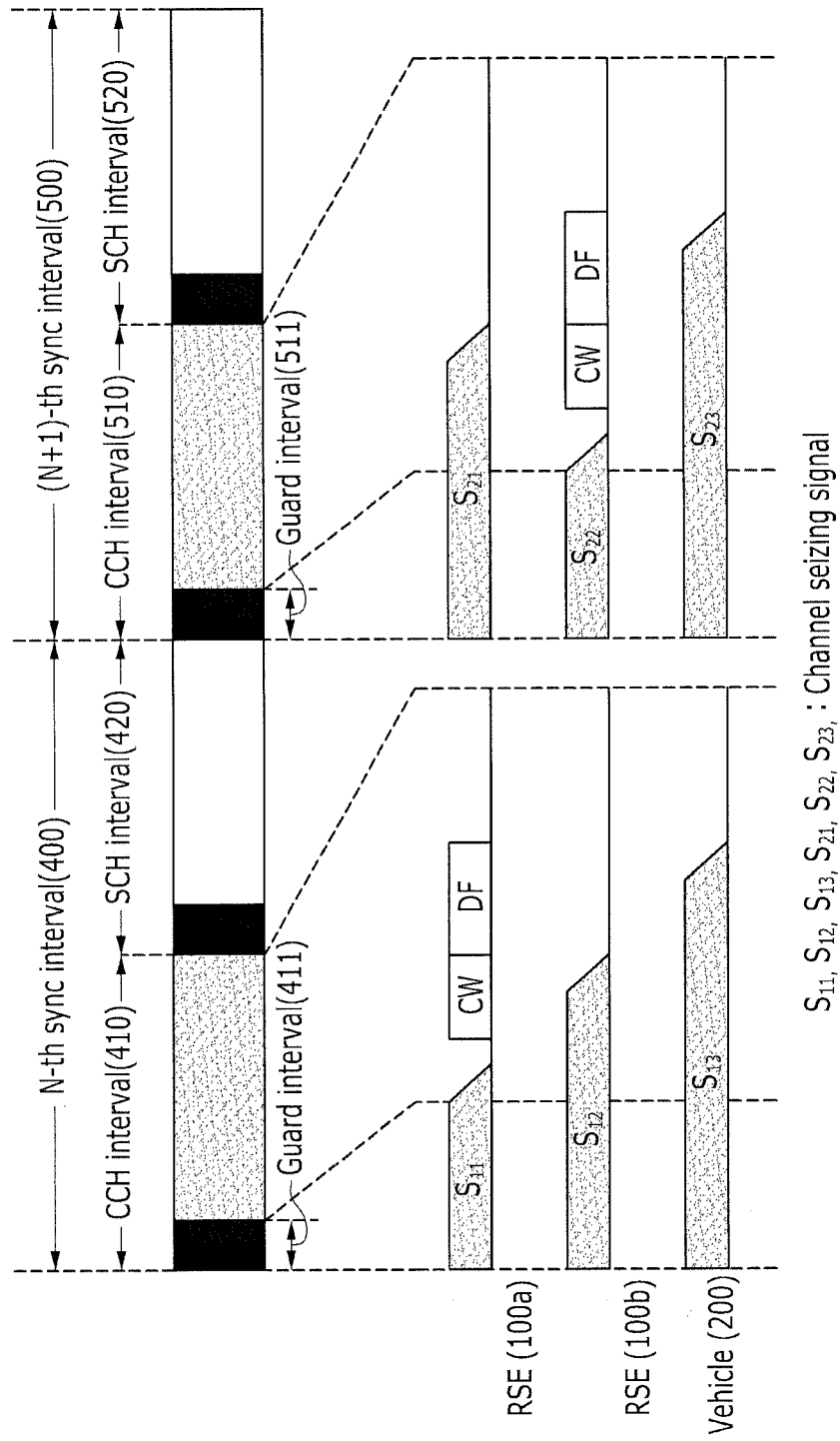
FIG. 4 is a diagram illustrating an example of channel seizing signal generating in an RSE according to an exemplary embodiment of the present invention.
Figure 5A:
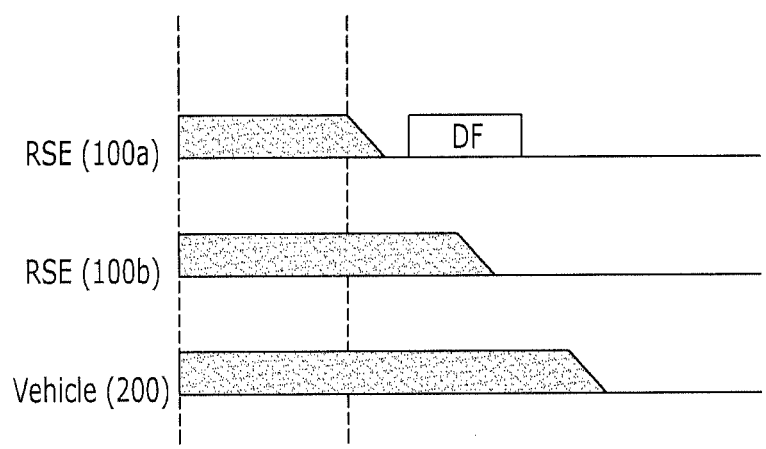
FIG. 5A is a diagram illustrating an example of a channel seizing signal in a minimum CW value according to an exemplary embodiment of the present invention.
Figure 5B:
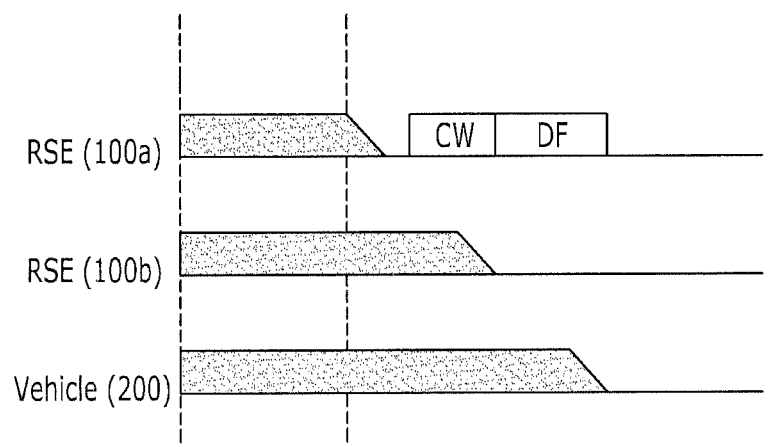
FIG. 5B is a diagram illustrating an example of a channel seizing signal in a maximum CW value according to an exemplary embodiment of the present invention.

FIG. 4 is a diagram illustrating an example of a channel seizing signal generating in an RSE according to an exemplary embodiment of the present invention. FIG. 5A is a diagram illustrating an example of a channel seizing signal in a minimum CW value according to an exemplary embodiment of the present invention, and FIG. 5B is a diagram illustrating an example of a channel seizing signal in a maximum CW value according to an exemplary embodiment of the present invention.

Referring to FIGS. 1 and 4, the RSEs 100a-100f of the intelligent transport system 10 according to an exemplary embodiment of the present invention transmit information thereof to the OBE 210 that is mounted in the vehicle 200 without collision with adjacent base stations by adjusting a length of a channel seizing signal. That is, the RSEs 100a-100f differentiate access to a CCH interval by differently adjusting a length of a channel seizing signal of the RSE that is adjacent to the RSEs 100a-100f even after a guard interval of a sync interval is terminated.

In this case, because the WAVE that is used in an exemplary embodiment of the present invention uses a distributed coordination function (DCF) method of a wireless local area network (WLAN) as a basic method of medium access control (MAC), when approaching the channel, a backoff procedure should be performed. The backoff procedure according to an exemplary embodiment of the present invention is used to prevent data from colliding in a vehicle communication environment and is technology for transmitting data by approaching a channel after waiting within a predetermined time period using a backoff algorithm.

For example, it is assumed that the RSEs 100a and 100b of the RSEs 100a-100f and the vehicle 200 perform communication, and when a backoff procedure is performed, the RSE 100b generates a channel seizing signal $S_{12}$ that is longer than that of the RSE 100a in a CCH interval 410 of an N-th sync interval 400. Here, N is an odd number. The RSE 100a performs a backoff procedure by determining a random CW value among values including a minimum CW value and a maximum CW value. The CW value according to an exemplary embodiment of the present invention can be changed according to setting, and may be set to a minimum CW value as shown in FIG. 5A or to a maximum CW value as shown in FIG. 5B, and may be set to a random value among values between a minimum CW value and a maximum CW value. In this case, because the RSE 100a may perform a backoff procedure with a maximum CW value, the RSE 100b generates a channel seizing signal $S_{12}$ that is sustained during an interval longer than an interval that a backoff procedure is performed with the maximum CW value in order to include the RSE 100a performing a backoff procedure with a maximum CW value.

The RSE 100a transmits a data frame (DF) after performing a backoff procedure at the CCH interval 410 of an N-th sync interval 400. In this case, the OBE 210 of the vehicle 200 sustain a channel seizing signal $S_{13}$ during an interval in which the RSE 100a performs a backoff procedure and transmits a DF at the CCH interval 410 of the N-th sync interval 400, thereby allowing a DF including base station information to safely be transmitted from the RSE 100a.

Next, the RSE 100a generates a channel seizing signal $S_{21}$ that is longer than that of the RSE 100b at a CCH interval 510 of an (N+1)-th sync interval 500. The RSE 100b performs a backoff procedure by determining a CW value among values including the minimum CW value and the maximum CW value. In this case, because the RSE 100b may perform a backoff procedure with a maximum CW value, the RSE 100a generates a channel seizing signal $S_{21}$ that is as long as an interval that the RSE 100b performs a backoff procedure with the maximum CW value in order to include the RSE 100b performing a backoff procedure with a maximum CW value.

The RSE 100b transmits a DF after performing a backoff procedure at the CCH interval 510 of the (N+1)-th sync interval 500. In this case, the OBE 210 of the vehicle 200 sustains a channel seizing signal $S_{23}$ during an interval that the RSE 100b performs a backoff procedure and transmits a DF at the CCH interval 510 of the (N+1)-th sync interval 500, thereby allowing the DF including base station information to be safely transmitted from the RSE 100b.

In this way, in a vehicle communication environment for supporting vehicle communication handover according to an exemplary embodiment of the present invention, the RSEs can stably transmit base station information without collision of data when approaching a CCH interval by generating a channel seizing signal that is different from that of an RSE that is adjacent thereto, thereby supporting continuous handover.

According to an exemplary embodiment of the present invention, by generating and providing a signal for supporting handover in a vehicle communication environment, an uninterrupted service can be continuously provided when moving at a high speed, thereby supporting stable handover technology.

An exemplary embodiment of the present invention may not only be embodied through the above-described apparatus and method but may also be embodied through a program that realizes a function corresponding to a configuration of the exemplary embodiment of the present invention or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of generating a signal for supporting vehicle communication handover in a plurality of sets of road side equipment (RSE), the method comprising,
    when supporting the handover from a first RSE of the plurality of RSEs and a second RSE that is adjacent to the first RSE to a vehicle:
    generating, by the second RSE, a second channel seizing signal that is longer than that of the first RSE in a control channel of an N-th sync interval, to allow the first RSE to transmit a data frame in the N-th sync interval; and
    generating, by the first RSE, a first channel seizing signal that is longer than that of the second RSE in a control channel of an (N+1)-th sync interval, to allow the second RSE to transmit a data frame in the (N+1)-th sync interval;
    wherein the generating of the second channel seizing signal comprises sustaining, by the second RSE, the second channel seizing signal during an interval in which the first RSE performs a backoff procedure with a maximum contention window (CW) value in the control channel of the N-th sync interval.

2. The method of claim 1, wherein the vehicle sustains a third channel seizing signal during an interval in which the first RSE performs the backoff procedure and transmits the data frame after performing the backoff procedure in the control channel of the N-th sync interval.

3. The method of claim 1, wherein the generating of the first channel seizing signal comprises sustaining, by the first RSE, the first channel seizing signal during an interval in which the second RSE performs a backoff procedure with a maximum CW value in the control channel of the (N+1)-th sync interval.

4. The method of claim 3, wherein the vehicle sustains a third channel seizing signal an interval in which the second RSE performs the backoff procedure and transmits the data frame after performing the backoff procedure in the control channel of the (N+1)-th sync interval.

5. A method of generating a signal for supporting vehicle communication handover in a plurality of RSEs, the method comprising,
    when supporting the handover from a first RSE of the plurality of RSEs and a second RSE that is adjacent to the first RSE to a vehicle:
    generating, by the first RSE, a first channel seizing signal longer than that of the second RSE in a control channel of an (N+1)-th sync interval, to allow the second RSE to transmit a data frame in the (N+1)-th sync interval;
    sustaining, by the first RSE, the first channel seizing signal an interval in which the second RSE performs a backoff procedure with a maximum CW value in the control channel of the (N+1)-th sync interval;
    generating, by the second RSE, a second channel seizing signal that is longer than that of the first RSE in a control channel of an N-th sync interval, to allow the first RSE to transmit a data frame in the N-th sync interval; and
    sustaining, by the second RSE, the second channel seizing signal during an interval in which the first RSE performs a backoff procedure with a maximum CW value in the control channel of the N-th sync interval.

6. The method of claim 5, wherein the vehicle sustains a third channel seizing signal during an interval in which the second RSE performs the backoff procedure and transmits a data frame after performing the backoff procedure in the control channel of the (N+1)-th sync interval.

7. The method of claim 5,
    wherein the vehicle sustains a third channel seizing signal during an interval in which the first RSE performs the backoff procedure and transmits a data frame after performing the backoff procedure in the control channel of the N-th sync interval.

* * * * *